United States Patent [19]

Rackin

[11] Patent Number: 4,674,083
[45] Date of Patent: Jun. 16, 1987

[54] TIME DIVISION MULTIPLEXED SWITCHING STRUCTURE FOR PBX

[75] Inventor: Mark H. Rackin, Dunwoody, Ga.

[73] Assignee: Solid State Systems, Inc., Marietta, Ga.

[21] Appl. No.: 672,061

[22] Filed: Nov. 16, 1984

[51] Int. Cl.[4] .......................................... H04Q 11/04
[52] U.S. Cl. ........................................ 370/67; 370/85
[58] Field of Search ....................... 370/67, 58, 85, 86, 370/88

[56] References Cited

U.S. PATENT DOCUMENTS

| | | | |
|---|---|---|---|
| 3,959,596 | 5/1976 | Bojanek et al. | 179/15 |
| 4,138,597 | 2/1979 | Ashford | 370/67 |
| 4,287,590 | 9/1981 | Boute et al. | 370/67 |
| 4,340,960 | 7/1982 | Moran | 370/62 |
| 4,385,379 | 5/1983 | Kelly et al. | 370/56 |
| 4,536,873 | 8/1985 | Leete | 370/85 |
| 4,545,049 | 10/1985 | Kammerer et al. | 370/67 |
| 4,564,936 | 1/1986 | Takahashi | 370/67 |
| 4,577,310 | 3/1986 | Korsky et al. | 370/67 |

FOREIGN PATENT DOCUMENTS

| | | |
|---|---|---|
| 0100614 | 2/1984 | European Pat. Off. |
| 2014018A | 8/1979 | United Kingdom . |
| 2098831A | 11/1982 | United Kingdom . |

OTHER PUBLICATIONS

Three LSI Circuits Simplify Digital Switching Systems, Wurzburg, Kelly—Reprint from "Electronic Design" Oct. 25, 1980.

*Primary Examiner*—Douglas W. Olms
*Attorney, Agent, or Firm*—Jones & Askew

[57] ABSTRACT

An improved time division multiplexed switch, particularly useful in a private branch telephone exchange. Any number of ports, limited only by the drive capability of the devices used, may be connected to the switch. Each port may transmit or receive on any combination of data line and time slot. Each combination of time slot and data line comprises a path, the number of paths being equal to the product of the number of data lines and time slots. Connection between a transmit port and receive port is implemented by writing a path select control word consisting of a time slot select control word and a data line control word to registers associated with the port. The register for the data line select on the receive side latches the data line select command into the select inputs of a multiplexer connecting the port receive line to the appropriate one of a plurality of data lines shared by the ports. The time slot select portion of the path select command is latched into a register from which a counter is repetitively loaded. All counters are synchronously loaded at the beginning of a system frame and the counters are clocked by a signal toggling at the time slot rate. When the counter reaches a terminal count, an output goes active indicating that the transmit or receive port's time slot has been reached, thus enabling an interface device which then connects a utilization device to the appropriate highway data line.

9 Claims, 8 Drawing Figures

TIME DIVISION MULTIPLEXED SWITCHING STRUCTURE FOR PBX

TECHNICAL FIELD

The present invention is a time division multiplexed digital switching device. In particular, it is an improved TDM switch, particularly useful in the environment of private branch exchange (PBX) telephone systems, but which may also be useful in other digital communications networks, both within the field of telephony and otherwise. More particularly the improved TDM switch of the present invention provides a truly non-blocking switch in circumstances in which the number of ports connected to the switch does not exceed the number of paths, in that any port may be connected to any line/time slot path combination.

BACKGROUND OF THE INVENTION

In recent years, the use of time division multipled digital switches in private branch exchange (PBX) telephone systems has become a virtual standard. In such systems, voice signals are digitized, and digital samples of the voice signals are switched throughout the system between various ports which normally constitute station lines of the PBX, interfaces to telephone company trunk lines, conference bridges, and the like. Similar digital switches are also being used as replacements for cross point switches in telephone central offices, and in toll switches within the toll telephone network.

As the cost of high speed digital electronic components is dropped, the cost of digital PBX equipment has also dropped and additional features have been added to private branch exchanges.

However, the digital switch still represents the single most expensive item within a private branch exchange and this has historically placed a lower limit on the number of PBX extension lines which may be economically used in a particular application. At some point, it makes more economic sense to revert to an older key-type telephone system with its clumsy, and increasingly expensive cabling requirements.

TDM digital switches in prior art PBXs have almost universally included a memory time switch within the digital signal path. Memory time switches are devices which temporarily store incoming digitized samples, bound for a particular destination and wait until the appropriate time slot on the appropriate data line or bus occurs, corresponding to the time slot/line combination for the recipient of the digitized sample, and then inserts the sample into the appropriate time slot on the appropriate line or bus. Such digital time switches are expensive, and have been a major factor in keeping the above-referenced lower limit on the practical number of PBX station lines relatively high.

Other prior art TDM switches have been constructed so that relatively complex reconfigurations of the system are necessary as the number of ports (which term includes trunk interfaces and PBX station lines) connected to the system increases.

Therefore, there is a need in the prior art to provide a TDM switch, particularly one suitable for use in a private branch exchange, which may be inexpensively constructed, particularly in applications in which a relatively small number of PBX station lines are to be connected. There is a further need to construct such a switch which allows a private branch exchange to expand gracefully, without reconfiguration, up to and past the point where the total number of ports exceeds the total number of transmission paths available through the switch.

In accomplishing the first objective, it is highly desirable to provide a TDM switch for private branch exchange which eliminates the need for a memory time switch in all applications in which the number of ports is less than or equal to the number of transmission paths, and which does not require such a memory time switch up to a system size in which the total number of ports is several times the total number of available transmission paths.

To accomplish the second object, it is highly desirable to provide a TDM switch which possesses an architecture which readily lends itself to the retrofitting of a memory time switch as the PBX system expands.

The present invention fulfills this need of the prior art by providing an improved time division multiplexed switch structure for which any port may be connected to any transmission path. Thus, any port may be readily connected by the system to any combination of time slot and transmission or highway line, the time slot/line combination comprising a transmission path through the switch.

SUMMARY OF THE PRESENT INVENTION

The present invention fulfills this need in the prior art. Broadly characterized, the present invention provides an improved TDM switch to which a plurality of input and/or output ports may be connected. The present invention provides a relatively simple arrangement whereby any port may be connected to transmit or receive on any transmission path, without the use of a memory time switch. As used herein, the term "transmission path" means the combination of a particular one of a plurality of physical data paths and a particular one of a plurality of time slots.

In the preferred form of the present invention, each of the physical data paths constitutes a serial bit line (with appropriate reference to ground) and thus the preferred form is one in which serial data transmission is used and each physical path corresponds to a single line. However, it will be appreciated that embodiments of the present invention may be implemented in which each physical data path constitutes a parallel data bus. Thus, further references in this specification to data lines or data highways should be understood to include embodiments in which the multibit buses constitutes each data line.

The preferred form of the present invention implements this feature by providing a plurality of registers which could be implemented as a single register, for each port. A master controller writes a path select command word to the port registers, such word completely specifying both time slot selection and highway line selection. The preferred form further includes a counter or time slot selector associated with each port which cyclicly counts from an initial count defined by the path select command word to a terminal count characteristic of the counter. Upon reaching the terminal count, an output signal is provided which activates a multiplexing device associated with the port having select inputs which are controlled by the portion of the path select command word defining the particular physical data path to which the port is to be connected. Thus, when the terminal count for the counter at the particular port is reached, the multiplexing arrangement is activated, selecting the particular physical path to which the port is connected, at the appropriate time as indicated by the output signal from the counter.

Therefore, in setting up a communication path between two ports, one serving as a transmission port and one serving as a receiving port, the same path command word will be written to each of the two ports. If one or both of the ports are bidirectional, the command word will be written into the appropriate register (either transmission path select or receive path select) at each port. The counters associated with each port will count until the appropriate time slot is reached, at which time the terminal count output signal from each counter will be provided to the multiplexer associated with each of the ports. This will cause the multiplexing device at each port to select the particular physical data path and to connect both the transmission port and the receiver port to the particular physical data path, thus allowing data to be transmitted from transmission port to receiver port.

From the above description, it should be appreciated that the preferred form of the present invention provides the following features. First, it provides an arrangement whereby any port may be connected to any physical data path during any time slot. Secondly, the system is completely synchronous in its preferred form. In the preferred embodiment, each of the above-referenced counters is loaded with the number currently contained in its associated time slot select register in response to a synchronous, system-wide framing signal defining the beginning of a frame of M time slots. The counters then synchronously count the number of time slots and, upon reaching the appropriate terminal count, each counter is prepared to connect its appropriate device to the appropriate data path. In this fashion, communication can be established between any two ports over any possible transmission path without the use of a memory time switch.

Furthermore, since the preferred form is one in which the data defining a transmission path for each port is latched into registers or similar devices, a master controller controlling the system need only concern itself with the establishment or termination of transmission paths between ports when a change of status is detected at a particular port. In the most preferred form of the present invention, as employed in a PBX, this corresponds to detection of a change of hook switch status.

Again, the preferred form of the present invention implements a master controller for assigning transmission paths in which the ports comprise part of the memory mapped input/output section of the address space of a microcomputer or microprocessor within the master controller. In its most preferred form, wherein each port may possess both a transmission and receive section, each register (transmit or receive) at each port is defined by a predetermined address within the memory mapped portion of the controller's address space. By adopting this expedient, the only data which needs to be transmitted in connection with a particular write to one of the I/O ports is the path select command words specifying the particular path to which the transmit or receive section of the port should be connected. The address to which the path select command word is written fully specifies both the port, and the particular side of the port (transmit or receive), that is to use that particular transmission path.

Note that once this word has been written to the appropriate port, the access controller for that particular side of that particular port, comprising the above-noted registers, counter, and multiplexing device, will automatically and synchronously implement the connection to the selected transmission path until a change of status of the port is detected by the controller indicating that the transmission should be terminated, or the path should be changed.

Also, from the following description it will become apparent that the structure of the switch of the present invention lends itself to implementing a system that cannot be accomplished with conventional memory time switches. Time slots may be concatenated or subdivided on a port by port basis without any modification to the switch. Only the time slot selectors at various ports and the commands issued to these ports need be modified.

From the foregoing, it will be appreciated that the present invention is one which indeed lends itself to graceful expansion. Since any port may be connected to any transmission path, there is never a problem of blocking when the number of ports which must be connected does not exceed the number of available transmission paths. It should be noted that in connection with this statement, that each port having both a transmit side and a receive side would be considered two ports for purposes of this limitation.

However, by adoption of the preferred embodiment, there is no need to reconfigure the system when the number of ports exceeds the number of available transmission paths. Since both a transmit side and a receive side of each port is treated as a single address within the controller address space, and the transmission path to be used by the port is defined by a data word written to that port, there is no need to reconfigure a system as additional ports are added. This situation is limited only by statistical traffic experience in the particular application.

Thus, it is an object of the present invention to provide an improved time division multiplexed switch structure to which a plurality of communication ports may be connected for which any port may be connected to any transmission path comprising a combination of physical data path and time slot.

It is a further object of the present invention to implement such a device for which all these connections may be implemented without the use of a memory time switch.

It is a further object of the present invention to provide an improved, less expensive, TDM switch structure which minimizes the use of master controller time.

Thus, it is an object of the present invention to provide a TDM switch for which communication between two ports connected to the switch may be implemented by the controller simply writing two commands to two separate addresses. Once the path is set up, access controllers at each port assure maintenance of the connection until the controller detects a condition indicating that the transmission path should be terminated.

It is a further object of the present invention to provide an improved TDM switch for which the number of ports to be connected to the switch is limited only by the portion of the controller address space assigned to port, thus allowing any port equal access to a transmission path through the switch without reconfiguring the system.

It is still a further object of the present invention to provide an improved TDM switch structure in which access to a particular data path/time slot combination is controlled locally at each port connected to the switch, and for which control is implemented synchronously.

It is a further object of the present invention to provide a TDM switch particularly suited for private branch exchange applications but which is also particularly suited to switching of both digitized voice and digital data over transmission paths with a minimum of system reconfiguration. In connection with this object, it is preferred to have an embodiment of the present invention constructed using serial data paths so that conventional CODECs and serial data transmission and receiving devices may be readily connected to the system.

That the present invention accomplishes these objects, and overcomes the above-noted drawbacks of the prior art, will be appreciated from the description of the preferred embodiment below.

BRIEF DESCRIPTION OF THE DRAWINGS

FIG. 3, consisting of FIGS. 3A and 3B, is timing diagrams showing the timing relationship of various signals used in the preferred embodiment.

DETAILED DESCRIPTION

Figure 1:
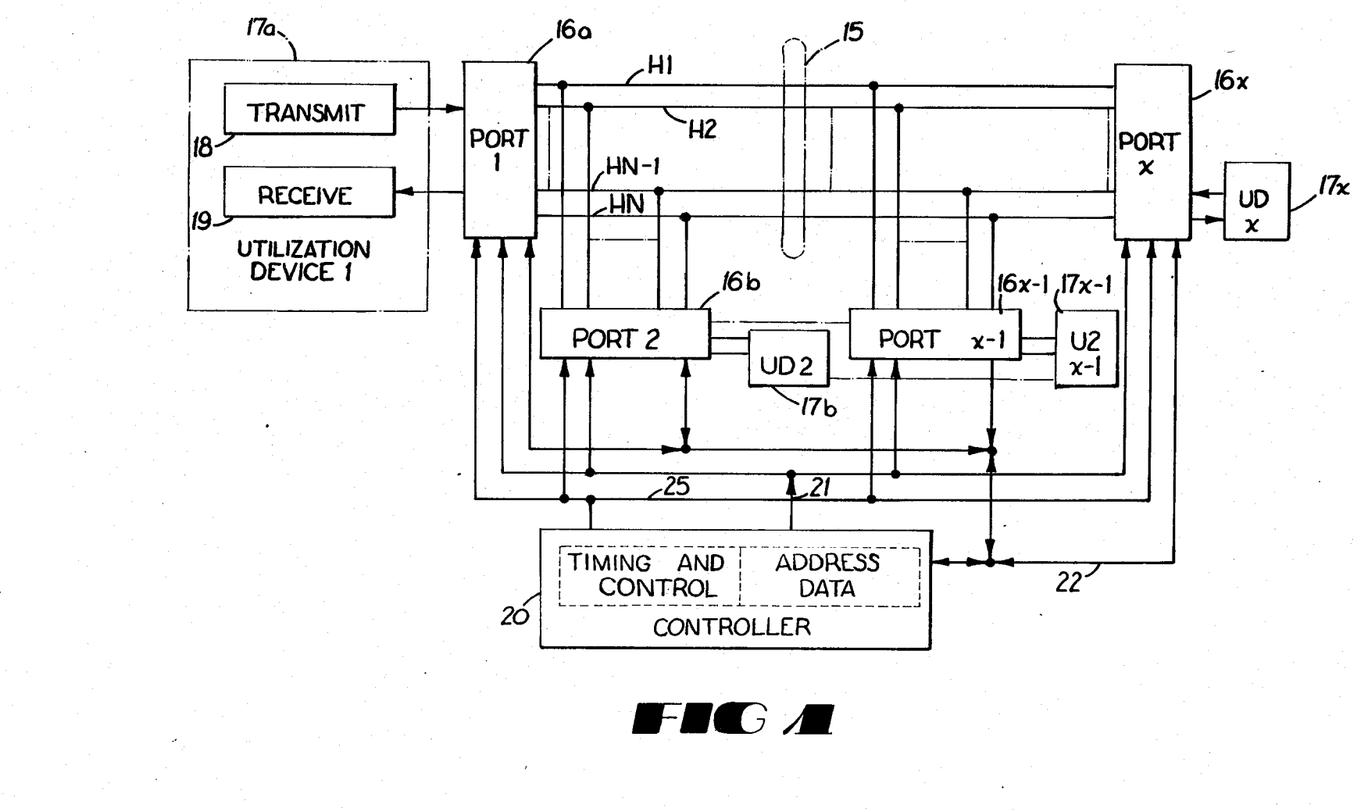
FIG. 1 is a block diagram of a TDM switch embodying the present invention.

Turning next to the drawing figures in which like numerals designate like parts, the preferred embodiment of the present invention will be described. FIG. 1 is a block diagram of an embodiment of the present invention. A plurality of receive and transmit highways, shown collectively as 15, provide the paths for transmission of data. It should be understood that in the preferred embodiment disclosed herein, the environment of the present invention is a private branch telephone exchange. Therefore, the term data includes not only conventional binary data, but binary encoded samples of analog signals being transmitted through the switch. Highways 15 include highways labeled H1, H2 ... HN indicating that an arbitrary member N highways may be used in constructing embodiments of the present invention. Because of common practices in fabricating digital electronic devices, it is preferable, but not essential, to make N an integer power of two. In the preferred embodiment, N is equal to eight.

Connected to highways 15 are a plurality of ports 16. As illustrated in FIG. 1, an arbitrary number X of port 16 may be connected to highways 15 in embodiments of the preferred invention. The number X is limited only by the drive capability of the devices (not shown in FIG. 1) driving highways 15 and the statistical traffic experience encountered in the environment in which the present invention is used. Connected to each port is one of a plurality of utilization devices 17. Device 17a shows that each utilization device may include both a transmission port 18 and a receive port 19. Alternately, other of the utilization devices 17 may be configured to be transmit only or receive only.

The traffic on highways 15 is controlled by a master controller 20. In the preferred embodiment, master controller 20 is constructed using a Z-80 microprocessor and other standard parts in the Z-80 chip set. Of course, embodiments of the present invention may be constructed using other microprocessors, microcomputers, and control devices. Controller 20 accesses each of ports 16 through an address bus 21 and a bidirectional data bus 22. Additionally, controller 20 provides synchronous timing and control signals on a timing bus shown as 25 in FIG. 1. Thus, it should be appreciated that the passage of data among utilization devices 17 over highways 15, is synchronous in the preferred embodiment. In the preferred embodiment the clock system for microprocessor 27 is independent of the system clock generator which provide timing signals on bus 25.

Figure 2:
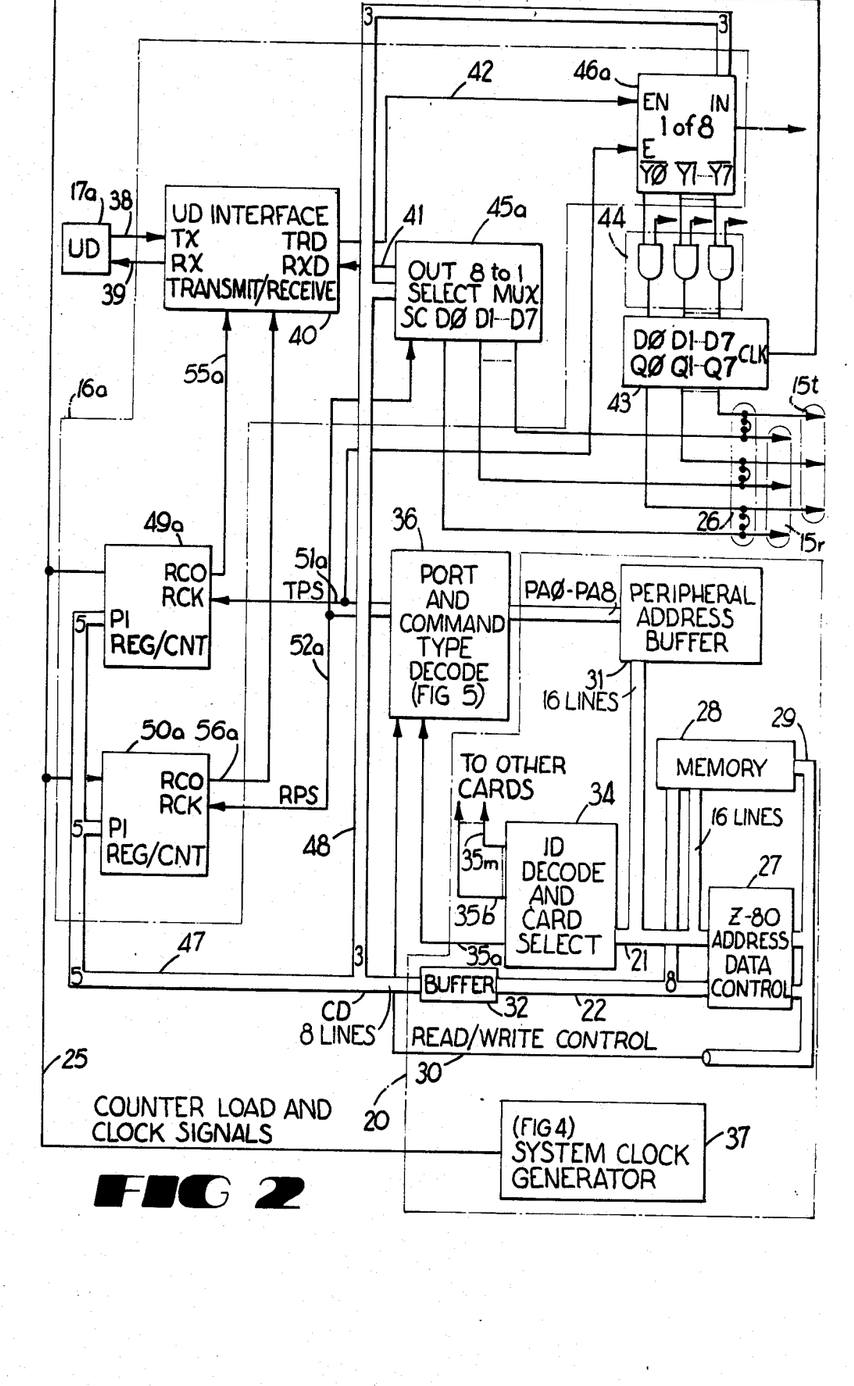
FIG. 2 is a more detailed block diagram of the preferred embodiment of the present invention.

Turning next to FIG. 2, an expanded block diagram of the preferred embodiment is shown. The elements which comprise controller 20 of FIG. 1, are shown as surrounded by dashed line 20 in FIG. 2. Similarly, the elements comprising an exemplary port 16a of FIG. 1 are surrounded by dashed line 16a in FIG. 2.

It should be appreciated that in the disclosed embodiment of the present invention, there is a great deal of duplicity among the circuit elements. Thus, most of this disclosure will describe exemplary embodiments of the elements of the invention and indicate where same are duplicated.

From inspection of FIG. 2, it will also be appreciated that certain elements shown thereon in the communications path between controller 20 and exemplary port 16a lie outside the dashed lines surrounding the elements defining the port and controller. Thus, it is appropriate to introduce a feature of the architecture of the preferred embodiment which will be referred to throughout this specification. The preferred embodiment of the present invention is a bus oriented structure wherein the various ports connected to the switch each are assigned a characteristic address. Thus, in performing input/output (I/O) operation between the controller and the various ports, the ports form a memory mapped I/O system.

The preferred embodiment is constructed with an architecture in which eight ports are each physically located on a single system card or module. Each card physically corresponds to a circuit board which may be inserted in a card cage in the physical embodiment of the present invention. Conventional address decoding apparatus performs card select functions. Further decoding on the card addresses particular ports located on that card.

Thus, references will be made throughout the specification to card selects and card addresses as well as particular port addresses. However, in the overall structure of the present invention, the combination of (cards/particular port on card) is simply an address to a particular port. Thus, it will be appreciated that embodiments of the present invention may be constructed in which the ports are accessed through a scheme other than conventional memory mapped I/O and references to particular cards are only made in the context of the preferred embodiment, the important aspect being that each port may be individually addressed.

Also, speaking more rigorously, the transmit and receive sides of an exemplary port, such as shown in FIGS. 1 and 2, each define a separately addressable port within the system. Therefore, for each bidirectional port, shown as a port 16 in FIG. 1, the system treats the transmit and receive side as an individually addressable port. However, for the sake of convenience, and in view of the nature of the disclosed environment of the preferred embodiment, this specification will normally speak of receive and transmit sides of a particular port, since most of the utilization devices used in the preferred embodiment are bidirectional communications devices.

Referring for a moment to the right-hand side of FIG. 2, it will be seen that highways 15 comprise a set of transmit highways 15t and a set of receive highways 15r. As noted above, the environment which led to development of the present invention is a private branch telephone exchange. In particular, the present invention was developed to provide a relatively inexpensive switch which could be economically adapted to small PBX systems and yet be expandable to larger systems through the use of a conventional memory time switch. Thus, in the preferred embodiment, each of transmit highway lines 15t is electrically connected to a corresponding receive highway line 15r by a plurality of jumpers shown as 26 in FIG. 2. Thus, electrically, the transmit and receive highway pairs form a set of bidirectional highways 15, such as illustrated in FIG. 1. However, it will be readily appreciated that the architecture of the preferred embodiment lends itself to expanding a PBX by removal of jumpers 26 and insertion of a conventional memory time switch between the individual transmit and receive highway lines.

Turning first to controller 20, as illustrated in FIG. 2, it will be appreciated that controller 20 is preferably constructed using a conventional microprocessor chip set, the Z-80 chip set. The main control element of the master controller is Z-80 CPU chip 27. The Z-80 CPU drives address bus 21, and bidirectional data bus 22 in a conventional manner. System memory is shown at 28 and will be understood to include both random access memory for storing various tables and status information concerning the preferred embodiment, and read only memory for controlling microprocessor 27. A conventional Z-80 control bus is shown as 29. A portion of the control bus 29 is brought out as read/write controls 30, in a manner which will be known to those skilled in the art. Buses 21 and 22 are buffererd in a conventional manner by buffers 31 and 32.

A conventional I/O decode and card select address decoder is shown as 34. As will be appreciated by those skilled in the art, decoder 34 is a conventional first level of decoding which defines the portion of the system memory space devoted to I/O devices. In the preferred embodiment, all I/O devices lie in a 4-K block of the system address lying between hexadecimal addresses F000 and FFFF. The general input/output ports 16, such as illustrated in FIGS. 1 and 2, are in the portion of the address space between addresses F000 and F3FF. In the preferred embodiment, the five least significant bits (A0–A4) of address bus 21 select a particular card when the higher order address lines are in an appropriate state.

In the illustrative example of FIG. 2, addressing to the particular card shown causes an active condition to appear on line 35a. Lines 35b through 35m are card select lines going to other cards within the system. Line 35a activates a card level port and command type decoder 36 which, according to the memory mapped I/O arrangement of the preferred embodiment, selects individual port read and write registers. Also, as noted on FIG. 2, details of port and command type decoder 36 are shown on FIG. 5.

Controller 20 also includes system clock generator 37 for producing the clocking and time slot signals in the preferred embodiment. As noted on FIG. 2, system clock generator 37 is shown in detail on FIG. 4. Persons skilled in the art will be very familiar with construction of the other elements of controller 20, and thus no further detail need be provided.

Next, the elements of exemplary port 16a on FIG. 2 will be described. The purpose of port 16a is to properly connect transmit line 38 and receive line 39 of utilization device 17 to highways 15, at appropriate time slots. As noted hereinabove, each port 17 may be connected to any path through the switch of the preferred embodiment. Each path constitutes a combination of one of physical highway lines 15 and one of the time slots described hereinbelow.

Utilization device 17 is connected to port input and output lines 41 and 42, respectively. Port receive line 41 comes from an eight to one multiplexing device 45a, the eight inputs of which are connected to respective ones of highway lines 15. Transmit line 42 enables a 3-bit to one of eight data decoder 46a.

An extension of data bus 22 from controller 20 appears as the card data bus, CD, to the exemplary card shown in FIG. 2. Five bits of this extension of the data bus form a five-bit sub-bus 47 with the remaining three bits forming a sub-bus 48. In the preferred embodiment, the five bits of information carried on sub-bus 5 constitute a time slot select command when writing to the time slot selectors. Similarly, the three-bit sub-bus 48 carries a highway line select command which will be described in detail hereinbelow. From this description, it will become apparent that the preferred embodiment employs eight possible highway lines and thirty-two possible time slots for a total of two hundred fifty-six paths through the switch of the preferred embodiment.

In the preferred embodiment, each of devices 45 and 46 controlling access from interface device 40 to highway lines 15 include an integral three-bit register for latching the state present on sub-bus 48 when controller 20 performs a write operation to these registers. Thus, multiplexing device 45a will have the three-bit select command which appeared on sub-bus 48 latched into its register which will select a particular one of the eight input lines (D0–D7) to be connected to its output on line 41. Thus, the highway line selected when utilization device interface 40 is activated is determined by a three-bit number which is latched into the register of device 45a during a write operation from controller 20. Once this highway line select command is latched, utilization device 17a will always be connected to the appropriate particular one of highway lines 15 until the controller determines that this connection is no longer needed and writes a different number to multiplexing device 45a.

Time slot selection at each port is determined by transmit time slot selector 49a and receive time slot selector 50a. In a manner similar to that described in connection with devices 45a and 46a, selectors 49a and 50a each include integral registers which maybe written to under the control of master controller 20. Time slot selectors 49a and 50a also include counters which may be cyclicly loaded from their integral registers. Thus, the registers within these devices determine a continuous modulus of the counter cycle. Signals from counter load and clock signals bus 25 control the loading of the counters within devices 49 and 50 from the registers, and provide the clocking signals to the integral counters.

Note that lines 51a and 52a are provided as outputs from the port and command type decoder 36. Line 51a is provided to the register clock (RCK) input to transmit time slot selector 49a and to a select clock input of multipler 45a. Line 51a carries a signal labeled TPS for transmit path select. Thus, it should be appreciated that the eight-bit word on data bus extension CD, which is divided between sub-buses 47 and 48, forms a path select command which is written into the registers of devices 45a and 49a. This writing occurs upon activation of line 51a when decoder 36 detects that the transmit side of port 16a is about to receive a path select command defining both the time slot and the highway line upon which it is to transmit data. In a similar manner, line 52a goes active when an address to the receive side of port 16a is detected by decoder 36. Line 52a carries a signal labeled RPS for receive path select.

Outputs from the transmit and receive time slot selectors appear on lines 55a and 56a, respectively. These outputs are conventional terminal count outputs showing that the counter has reached a maximum (or minimum) count. These lines are provided to transmit enable inputs to utilization device interface 40.

As will be explained in detail in connection with FIGS. 3–5, system clock generator 37 provides signals cyclically defining thirty-two time slots. Each occurrence of the thirty-two time slots constitutes a frame, the beginning of which is defined by a synchronization signal from system clock generator 37. The value from a respective register is loaded into the respective counter for time slot selectors 49 and 50 upon each occurrence of the synchronizing load signal and counting commences.

The counters in each of the time slot selectors are controlled by a clock signal which provides a transition of the appropriate sense to the clock input of the device's associated counter upon each occurrence of a time slot. Thus, the counters contained in time slot selectors 49 and 50 will each reach their terminal count at the end of a time slot, the identity of which is determined by the number loaded into the device's register. Thus, the signals on lines 55 and 56a will remain active for a period of one time slot, thus activating the transmit and receive sides of interface device 40 during the appropriate time slot. The foregoing describes the basic operation of the preferred embodiment. The balance of this disclosure provides details which the implementations of the various devices shown on FIG. 2. As noted above, devices identified specifically with reference numerals in FIG. 2 are identified with the same reference numerals in subsequent figures.

Figure 3A:
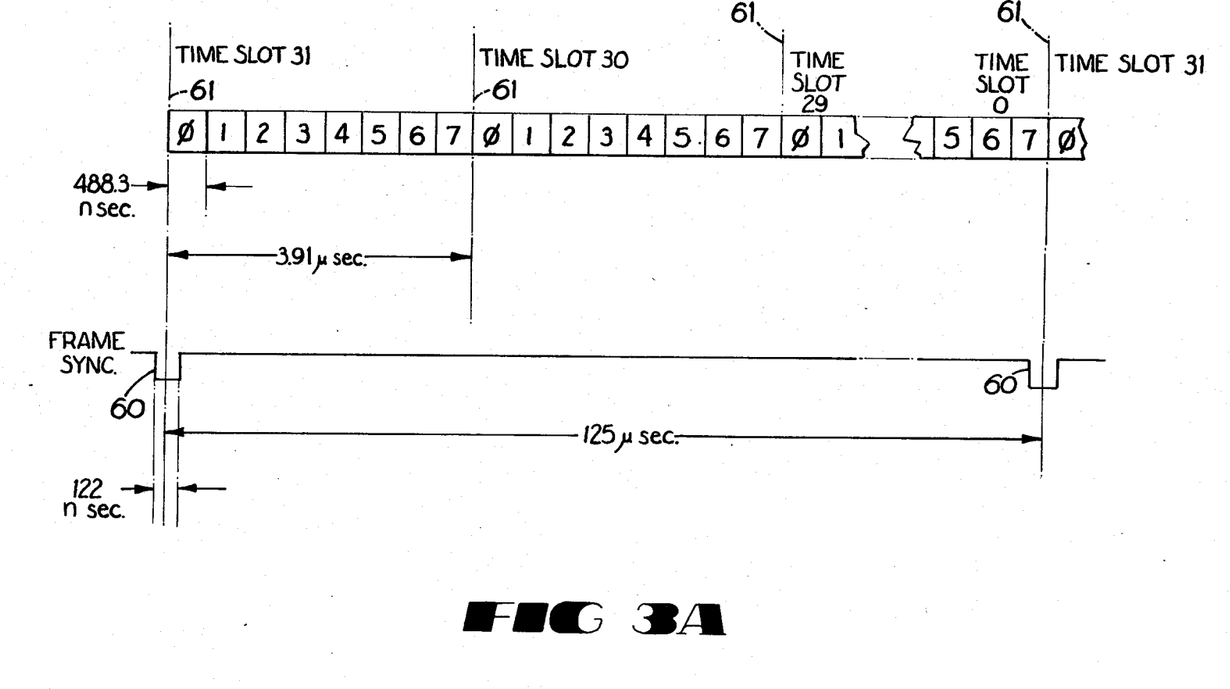
Figure 3B:
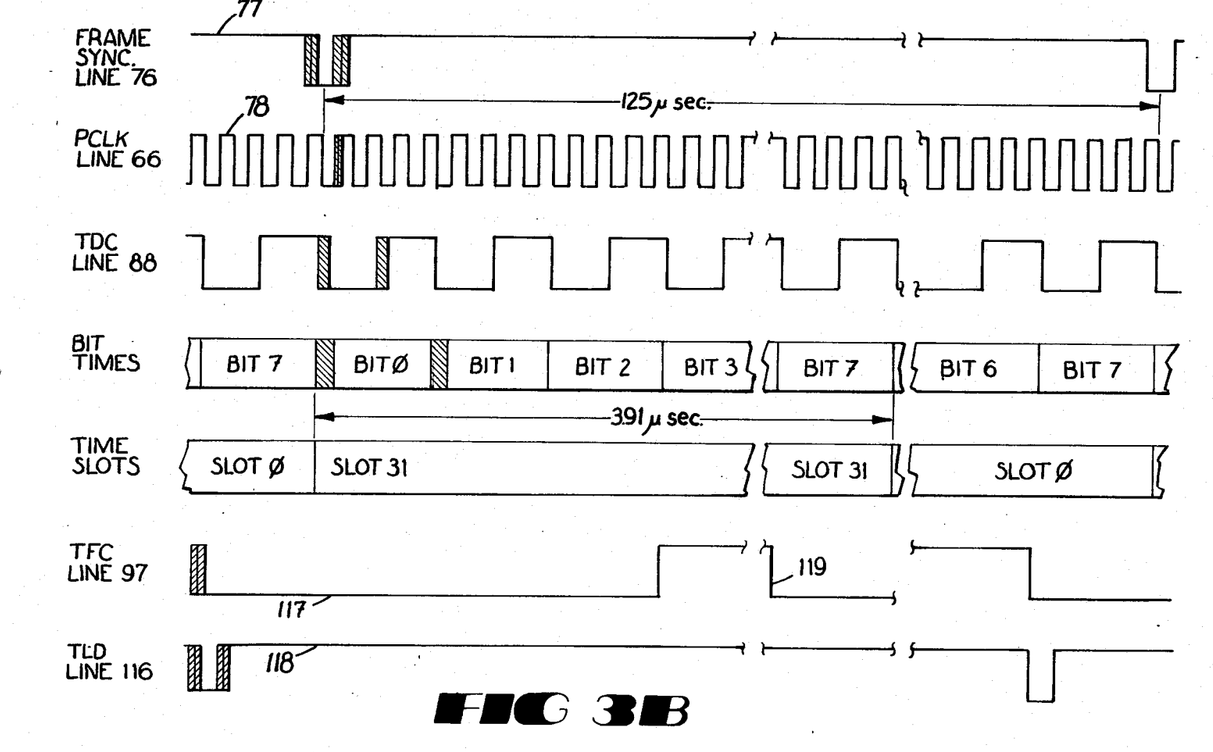

FIGS. 3A and 3B are timing diagrams showing the relationships among the various timing signals provided by system clock generator 37 (FIG. 2).

Next, the timing signals used in the preferred embodiment will be described in connection with FIGS. 3A and 3B, together with the description of the system clock generator 37 shown in detail in FIG. 4.

Turning first to FIG. 3A, the relationships among the data bit, time slot, and frame synchronization (frame sync) timing signals are shown. In the preferred embodiment, a frame exists between contiguous frame sync signals 60 shown in FIG. 3A. Each frame sync signal is approximately 122 nanoseconds wide and they occur every 125 microseconds giving a frame rate of 8 kilohertz in the preferred embodiment. Each frame is divided into thirty-two 3.91 microsecond time slots divided at the timing points shown by dashed lines 61 in FIG. 3A. Within each time slot, eight 488.3 nanosecond bit times are defined as shown in FIG. 3A. As may be seen from the notation on FIG. 3A, the convention adopted in the preferred embodiment is to define the first occurring time slot as time slot 31 and to have the time slots count down to time slot 0. The next time slot is again time slot 31 as may be seen above the frame sync pulse on the left-hand side of FIG. 3A.

Figure 4:
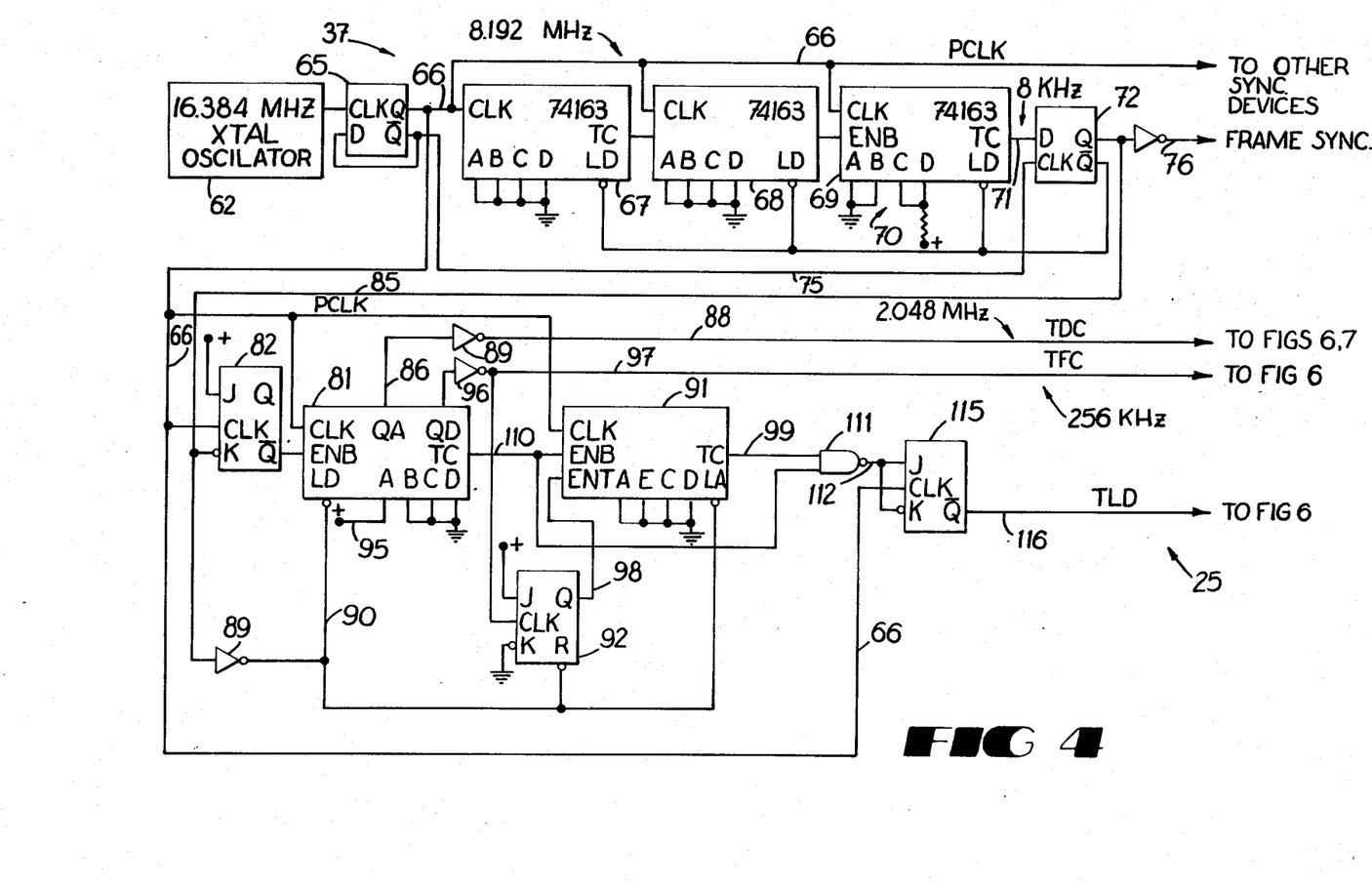
FIG. 4 is a schematic diagram of the time slot generating and clocking apparatus of the preferred embodiment which generates the signals depicted in FIG. 3.
Figure 7:
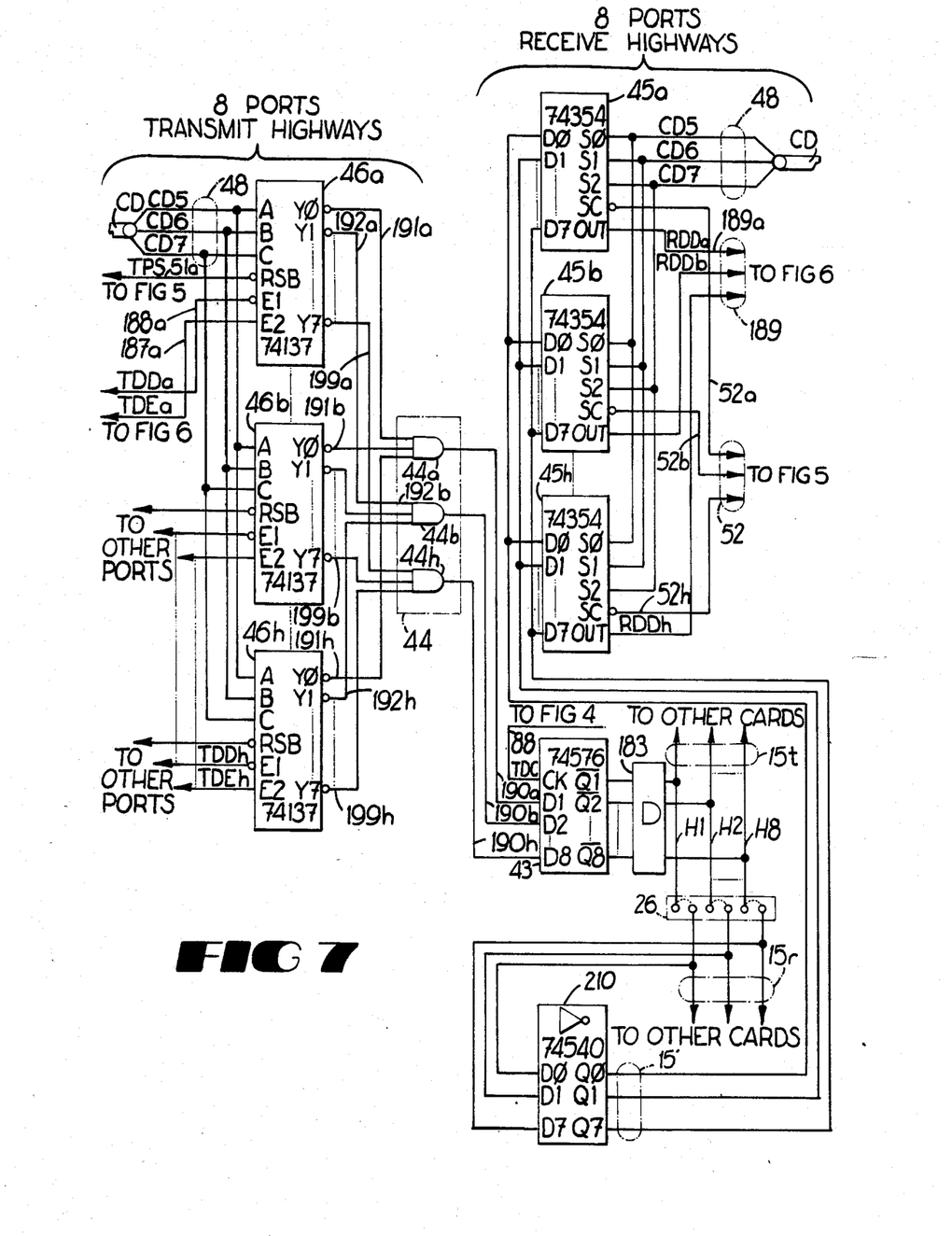
FIG. 7 is a schematic diagram of the bidirectional highways of the preferred embodiment and the highway or line select control apparatus for a plurality of ports on a single card of the preferred embodiment.

Turning to FIG. 4, system clock generator 37 (FIG. 2) is shown in detail. The preferred embodiment is constructed to lend itself to independent transmit and receive timing. However, since the transmit and receive highways are interconnected in the preferred embodiment (as shown at jumpers 26 in FIG. 2), it will be appreciated that transmit and receive timing schemes in the preferred embodiment are substantially identical. Thus, it should be understood that FIG. 4 shows apparatus for generating signals which are labeled as going to the transmit sides of the various ports of the preferred embodiment. However, the same signals are supplied to the receive side in the preferred embodiment (with the transmit and receive highways joined to provide bidirectional highways) and thus understanding of a transmit timing signal (labeled TXX) will lead to an understanding of the corresponding receive time signal (labeled RXX). The basic exception to this statement is that transmit and receive timing are skewed by one bit time to offset the delay provided by register 43 (FIGS. 2 and 7).

The clock source in the preferred embodiment is a 16.384 megahertz crystal oscillator 62. This is divided by flip-flop 65 to provide an 8.192 megahertz master clock signal on line 66. This signal is labeled PCLK and is provided to the clock inputs of most of the remaining counting devices on FIG. 4, as well as to other parts of the system which must be synchronized to the master clock.

The divider chain shown on the upper portion of FIG. 4 produces the frame synchronization signal shown on FIG. 3A. A pair of counters 67 and 68 conventionally provide a divide by 256 function. Counter 69 is configured as a scale of eight counter since its two most significant bits are forced to logical one upon a parallel load, as is indicated at 70. This provides a cumulative divide by 1024 between line 66 and line 71 which provides the input to D flip-flop 72. Flip-flop 72 is clocked by the signal on line 75 which is the negated form of the PCLK signal on line 66. Thus, it may be seen that the frame sync signal on line 76 is as shown in FIG. 3A. The use of the negated clock signal on line 75 causes the frame sync signal to nominally be symmetrically centered about a positive transition of the PCLK signal. The circuitry on the lower portion of FIG. 4 provides the other timing signals shown in FIG. 3B. Note that this circuitry also uses the PCLK signal on line 66 as its clock source.

FIG. 3B shows the relationships among the signals shown on FIG. 3A to the other timing signals produced by the circuitry on the lower portion of FIG. 4. The frame sync signal from line 76 is shown on line 77 of the timing diagram of FIG. 3B. The master clock signal from line 66 is shown on line 78 of the timing diagram. Also, bit times are shown at 79 and time slots are shown at 80 on FIG. 3B.

Before returning to FIG. 4, the following should be noted. Throughout the system of the preferred embodiment, the number of signals are buffered, often through inverting buffers. Thus, either positive or negative going transitions may be used to clock certain signals through the system. It should be understood that, unless otherwise noted, only the signal name is given on the drawings in this specification. Whether a signal is an asserted or negated form of the signal produced by the circuitry on FIG. 4 will be apparent to those skilled in the art.

The signal from line 66 clocks another counter 81 shown on the lower portion of FIG. 4. Counter 81 is enabled from the negated output of a J-NOT K flip-flop 82 which is also clocked by the signal on line 66. The NOT K input to flip flop 82 carries the inverse of the FRAME SYNC signal which is provided on line 85. Thus, under normal operating conditions (FRAME SYNC not active), flip-flop 82 will be in a toggle mode, thus performing a divide by two function enabling counter 81 on every other cycle of the clock signal on line 66. An output from the first stage of counter 81 is brought out on line 86. This signal is inverted by inverter 87 to provide a transmit data clock (TDC) signal on line 88. Thus, the bit data rate determined by the TDC signal is 2.048 megahertz, one-fourth of the master clock rate.

During the clock period in which the FRAME SYNC signal is active, line 85 goes high causing flip-flop 82 to be in a J=1,K=0 state. On the next clock transition, this forces the negated output of flip-flop 82 low, thus disabling counter 81. The logical one on line 85 is inverted by inverter 89 placing a logical zero on line 90. The zero on line 90 causes counters 81 and 91 to be loaded from their parallel inputs. This signal also clears flip-flop 92. Since the first stage of counter 81 is loaded with a logical one, as shown at 95, this causes the transmit data clock signal to be forced low during, and at the end of, the FRAME SYNC signal.

The last stage of counter 81 provides an output signal inverted by inverter 96 which appears on line 97 as the transmit frame clock (TFC) signal. This signal also clocks flip-flop 92. Since the TFC signal is equal to the TDC signal divided by eight, it has a frequency of 256 kilohertz. Naturally, since there are eight periods of the transmit data clock for each period of the transmit frame clock, the transmit frame clock counts time slots. Thus, as is shown in FIG. 3A, there are eight data bits per time slot.

Flip-flop 92 is configured as a toggle flip-flop and is clocked by the TFC signal. Its output appears on line 98 to the terminal count enable of counter 91. This causes the terminal count output of counter 91, which appears on line 99, to be enabled every other time the terminal count output of counter 81 on line 110 becomes active.

NAND gate 111 detects the coincidence between the terminal count outputs of counters 81 and 91 and provides a logical zero output on line 112 each time this occurs. This occurrence causes flip-flop 115 to have the state of its inputs reversed causing the flip-flop to set to a logical one condition for one period of the clock signal on line 66. This causes a 122 nanosecond negative going pulse to appear on line 116 as a transmit load (TLD) signal. It should be apparent from inspection of FIG. 4 that counter 91 counts a scale of 16, counting 16 occurrences of the transmit frame clock. Thus, counter 91 counts the occurrence of 16 time slots. Since flip-flop 92 enables the terminal count output on line 99 every other time counter 81 reaches its terminal count, line 99 becomes active upon the occurrence of 32 time slots, as described hereinabove.

The timing relationship for the bit times TDC and TFC are shown in FIG. 3B. As noted above, the TDC signal is forced low upon the beginning of each frame. Bit times are defined on negative going transitions of the transmit data clock. The TFC signal on line 97 is shown on timing line 117 of FIG. 3B. The negative going transition of the TFC signal, shown at 119, occurs at the end of bit time 6 and the beginning of the last bit (bit 7) of each time slot. As should be apparent, the negative edge of TFC is the signal which clocks the counters in time slot selectors 49a and 50a (FIG. 2) to count time slots.

One other aspect of the timing may be appreciated from inspection of FIGS. 3B and 4. The transmit load (TLD) signal is shown on timing line 118 of FIG. 3B. From inspection of FIG. 4, it may be seen that counter 81 is forced to its 0001 state each time the FRAME SYNC signal becomes active. Once this occurs, counter 81 will continuously count on a scale of 16 until the time at which the TLD signal becomes active. Following the divider chains which appear on the top and bottom of FIG. 4, it will be apparent to one skilled in the art that both the FRAME SYNC signal on line 76 and the transmit load (TLD) signal on line 116 each have a divider chain interposed between flip-flops producing these signals (72 and 115, respectively) with a divide ration of 1024.

However, since counter 81 is forced to its 0001 count upon the occurrence of the FRAME SYNC signal, it may be appreciated that the TLD signal has what might be considered a "head start" on the FRAME SYNC signal. Since counter 81 is forced to its logical one state, and is enabled by a divide by two flip-flop 82, it will be readily appreciated that the TLD signal will go active four cycles (one bit time) of the clock signal on line 66 before FRAME SYNC becomes active. As will be apparent to one skilled in the art, the TLD signal is what loads the counters of time slot selectors 49a and 50a (FIG. 2). Thus these counters are loaded from their respective registers just prior to each FRAME SYNC signal. As noted above, this arrangement gives the transmit ports a one bit time lead on the receive ports to compensate for the delay from register 43.

Figure 5:
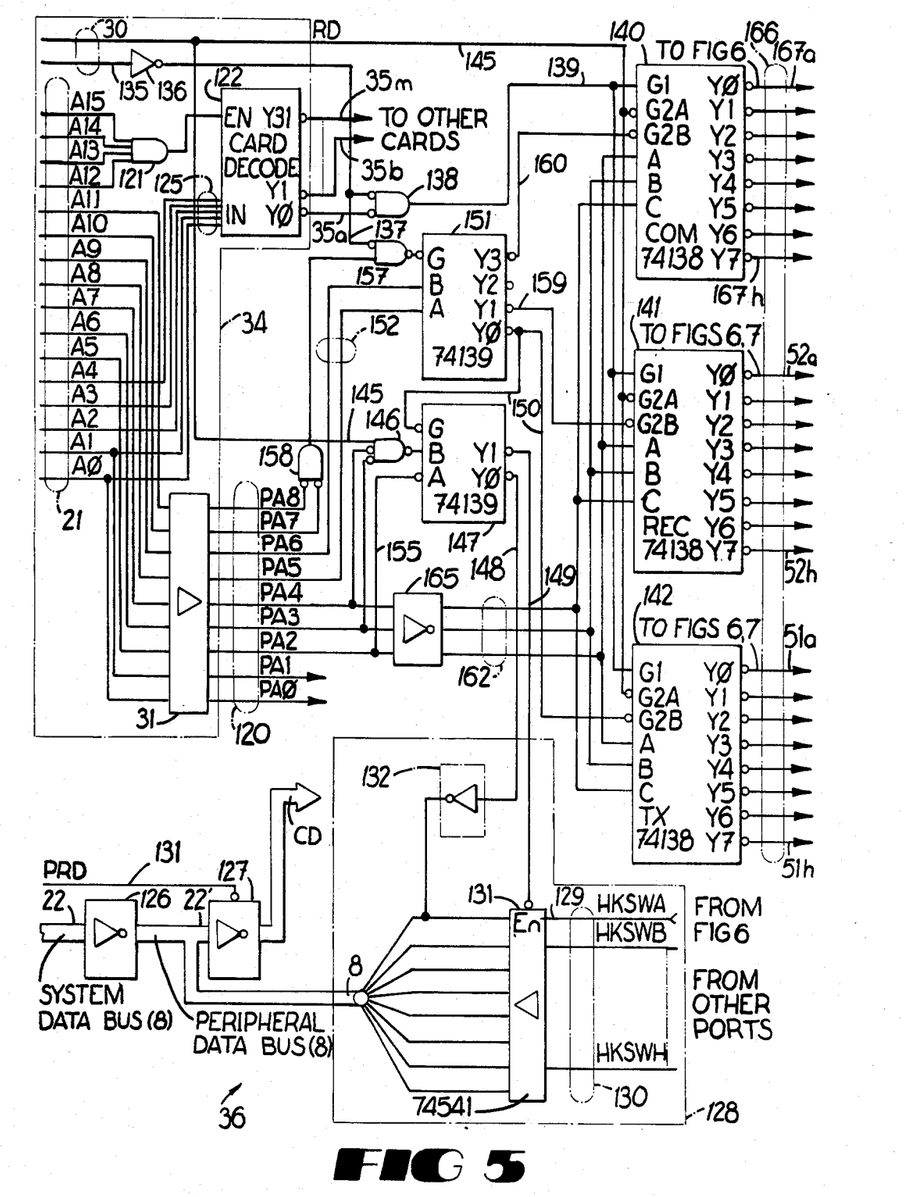
FIG. 5 is a schematic diagram of the decoding apparatus for controlling writing to and reading from a plurality of ports on a single card in the preferred embodiment.
Figure 6:
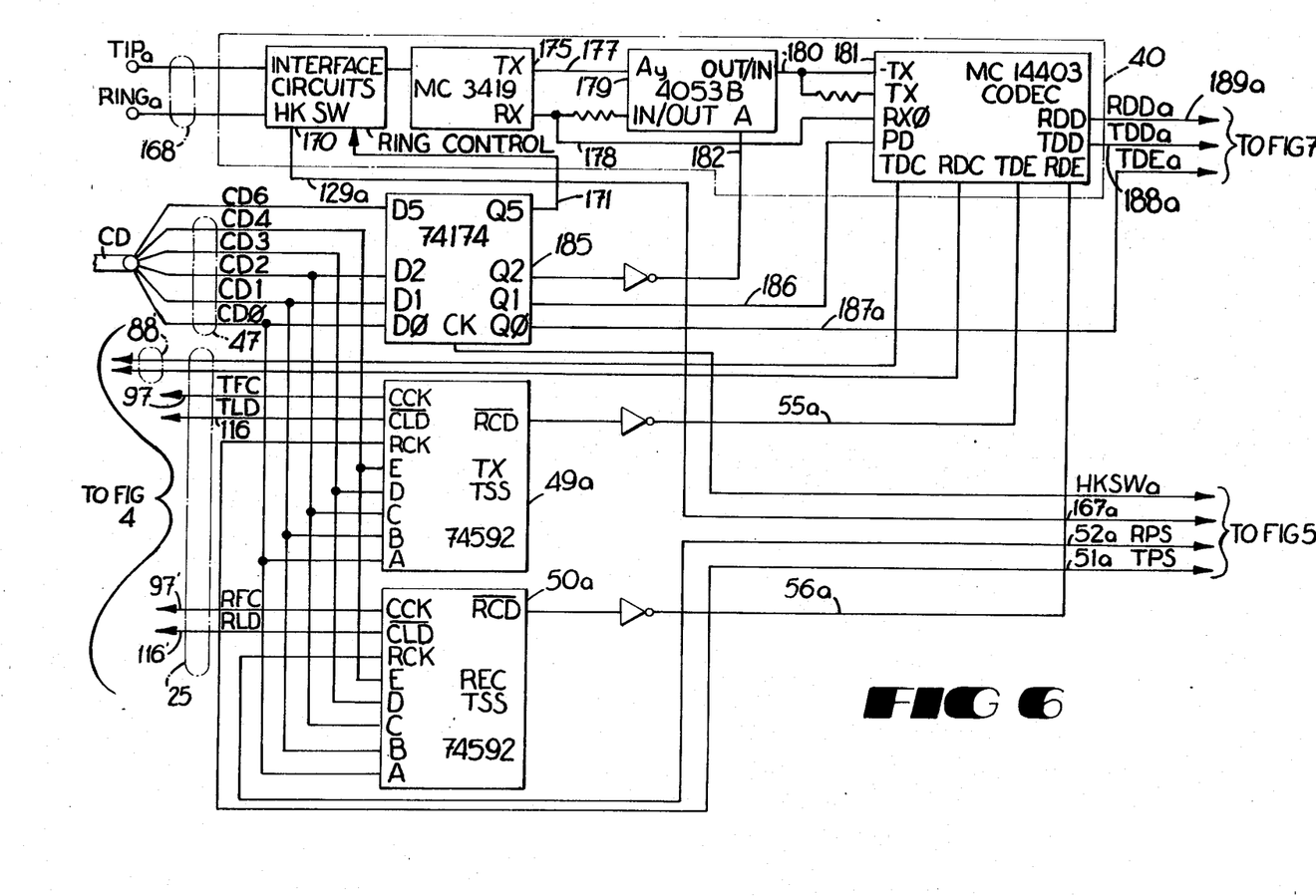
FIG. 6 is a schematic diagram of an input/output port of the preferred embodiment showing the receive and transmit time slots select apparatus.

FIGS. 5, 6 and 7 show details of the preferred embodiment illustrated on FIG. 2. FIG. 5 shows the structure of port and command type decoder 36 and I/O decode and card select decoder 34 shown in FIG. 2. On FIG. 5, the I/O and card select decoder is shown surrounded by dashed line 34. An extension of data bus 21 is provided to I/O and card select decoder 34. From this bus, lines A0, A1, and A5-A11 are brought to peripheral address buffer 31 and form peripheral address bus 120. AND gate 121 detects the occurrence of any address having lines A12-A15 equal to hexadecimal F. As described above, this condition must occur for the peripheral ports to be addressed within the system address space. When this occurs, card decoder 122 is enabled to decode the five lowest order address bits, shown collectively at 125, to select one of the possible 32 cards of the preferred embodiment.

The circuitry illustrated in this disclosure assumes that card lies at the lowest address of possible card address, and thus line 35a is brought out to the particular card shown on the right-hand side of FIG. 5. It should be appreciated that all circuitry to the right of the dashed line 34 surrounding I/O and card select decoder 34 will be duplicated for each card of the preferred embodiment and one of lines 35 from card decoder 122 will be provided to activate this circuitry during peripheral read/write operations.

System data bus 22 is buffered by buffer 126 and extended as peripheral data bus 22'. After further buffering by tri-state buffers 127, the bus is extended to all of the cards of the preferred embodiment as the card data bus, CD. A tap from data bus 122 is provided to status reading circuitry 128. In the preferred embodiment, the only data to be read from the general I/O ports to which telephones are connected is the status of the hook switch. The line carrying a status signal for the hook switch of a particular port shown in this specification is referenced as 129 in FIG. 5. It should be appreciated that eight hook switch lines, shown collectively as 130, are provided on the particular card, one hook switch status line for each port. A system peripheral read line 131 controls the tri-state inputs of buffer 127, placing the outputs of these buffers connected to card data bus CD in their high impedance state when the state of bus 22' from tri-state buffer 131 is to be read.

Also, a module type byte is provided for reading the type of module embodied by the particular card. For the general I/O port cards of the type described herein, only a single bit is used to define the card as a general I/O port. The response to the read operation is implemented by inverter 132 which provides a logical one output in response to the port and command type decoder 36 detecting a module type byte read request from master controller 20.

Before proceeding with describing the other circuitry on FIG. 5, it is appropriate to present a tabular form of the addressing scheme used for peripheral I/O addresses. The following table provides the significance of each address bit in the address map for read and write operations directed to cards and I/O ports. As noted above, all peripheral I/O reads are ones for which address lines A12–A15 are equal to one, and thus these bits are not shown separately.

side of FIG. 5 is taking place. This signal is provided to one of the enable inputs of port command decoders 140–142.

A peripheral read line 145 is also brought from controller 20 and extended as one input to gate 146. Gate 146 detects coincidence between the peripheral read signal and logical zeros on lines 3 and 4 of the peripheral address bus 120. Note from the table that this condition of lines PA3 and PA4 is necessary for each of the two module read operations shown in the table. Gate 146 outputs an active low to the B input of read decoder 147 when these conditions prevail.

In order for the Y0 or Y1 outputs (appearing respectively on lines 148 and 149) to become active, line 150 must be active, in its logical zero state. This indicates that two zeros were detected on bit lines 152 which are peripheral address lines PA5 and PA6. From the table, it will be appreciated that an occurrence of all zeros on lines PA3–PA6 indicates that one of the module or card reads is taking place.

The particular type of read is determined by line PA2 which is extended as line 155 to the A input of decoder 147. Thus, line 155 being zero activates line 149 causing the module status read operation to take place reading the status of all the hook switches on the particular card. The opposite state for line 155 activates line 148 causing a logical one to appear as the output of inverter 132.

It should be understood that other types of peripheral cards, including devices for writing to CRT terminals, conference bridges, etc. are provided which have more complex module status bytes than the one bit provided by inverter 132. It is to be noted that the individual port status byte operation defined by peripheral address lines PA8 through PA5 carrying hexadecimal 3, together with an active condition on system read line 145, is not decoded since such read operations are not required for I/O ports embodied as telephone connections in the preferred embodiment. All the necessary information is obtained from the hook switch status lines 130 which are read during the module status byte read operation described above.

Decoder 151 is the command type decoder. Gate 157 detects a coincidence between an active condition on the system write line 137 and the output of gate 158. Gate 158 detects the condition of zeros on peripheral

| I/O SPACE ADDRESS | | | | | | | | | | | | RD/WR | DESCRIPTION |
|---|---|---|---|---|---|---|---|---|---|---|---|---|---|
| A11 | A10 | A9 | A8 | A7 | A6 | A5 | A4 | A3 | A2 | A1 | A0 | | |
| 0 | 0 | 0 | 0 | 0 | 0 | 0 | Y | Z | Z | Z | Z | RD | MODULE STATUS BYTE |
| 0 | 0 | 0 | 0 | 0 | 0 | 1 | Y | Z | Z | Z | Z | RD | MODULE TYPE BYTE |
| 0 | 0 | 0 | 0 | X | X | X | Y | Z | Z | Z | Z | WR | TRANSMIT PATH COMMAND BYTE |
| 0 | 0 | 0 | 1 | X | X | X | Y | Z | Z | Z | Z | WR | RECEIVE PATH COMMAND BYTE |
| 0 | 0 | 1 | 0 | X | X | X | Y | Z | Z | Z | Z | WR | PAD CONTROL COMMAND BYTE |
| 0 | 0 | 1 | 1 | X | X | X | Y | Z | Z | Z | Z | WR | PORT CONTROL COMMAND BYTE |
| 0 | 0 | 1 | 1 | X | X | X | Y | Z | Z | Z | Z | RD | PORT STATUS BYTE |
| PA8 | PA7 | PA6 | PA5 | PA4 | PA3 | PA2 | — | — | — | PA1 | PA0 | | PERIPHERAL BUS ADDRESS LNS. |

XXX = Port No. on Module (0 to 7)
Y = Shelf No. (0 = Basic, 1 = Expansion)
ZZZZ = Card Slot No. (0 to 15)

It is believed that the circuitry of FIG. 5 will be more readily understood if reference is made to the foregoing table. A peripheral write (WR) line 135 is extended from controller 20, inverted by inverter 136, to give a negative going write pulse on line 137. Gate 138 detects the coincidence of a peripheral write signal and an active condition on card select line 35a. Thus, gate 138 puts out an active signal on line 139 when a write operation to the particular card illustrated on the right-hand address lines PA7 and PA8. Thus, gate 157 enables command type decoder 151 under the conditions of these two address lines being zero and an active condition on the system write line. Address lines 152 (PA5 and PA6) are then decoded to provide a command type signal on one of the decoder's outputs.

Note that a 10 condition on these lines is necessary for a pad control write operation. On the particular cards of the type illustrated in FIG. 5, which are cards for connecting to telephone ports, such pads are absent, and thus the Y2 output of command type decoder 151 is unconnected. The other three outputs which appear on lines 150, 159, and 160 represent the decoded output of address lines 152. It can be seen from the foregoing table that these conditions, coincident with an active write condition, define the three types of write operations directed to the telephone ports: transmit path command write, receive path command write, and port control command write.

Lines 160, 159, and 150 are each connected to an enable input of decoders 140-142, respectively. One of the other enable inputs for each of these decoders is connected to line 139 with the remaining enable being connected to system read line 145. Thus, it will be understood that for a particular one of decoders 140-142 to become enabled, system read line 145 must be inactive, the particular card upon which these decoders appear must have been selected (line 35a being active), and the system write line 135 must be active. When these conditions prevail, one and only one of decoders 140-142 will be active as selected by an active condition on one of lines 150, 159 or 160.

The enabled decoder decodes three bit sub-bus 162 which comes from buffer 165. Thus, a three bit sub-bus 162 carries negated versions of peripheral address lines PA2-PA4. From the foregoing table, it can be seen that these three address lines define the particular port to which a particular write command is directed. The outputs of decoders 140-142 are shown collectively as write strobes 166. It should be appreciated that the provision of any particular address on the system address bus defining a write operation to a particular port on the particular card illustrated in FIG. 5 will activate one and only one of write strobes 166.

From inspection of the foregoing table, it will be appreciated that decoder 140 provides a port command register write strobe on one of its output lines. Decoder 141 provides receive path select write strobes, and decoder 142 provides transmit path select write strobes. As illustrated on FIG. 5, there are eight outputs from each of these decoders, one being provided to each port on the particular card. Line 167a is the port command write strobe for the lowest numbered port on this particular card. Similarly, line 52a provides the receive path command strobe to the particular port and line 51a provides the transmit path strobe to the particular port. Note that lines 51 and 52 shown in FIG. 5 are identical to the lines bearing the same number shown in FIG. 2.

Turning next to FIG. 6, an illustration of the circuitry showing an exemplary port for connecting a telephone set in the preferred embodiment together with the time slot select devices associated with that port. FIG. 6 is arranged so that all of the lines (with the exception of the tip/ring pair 168) which are shown on the left-hand side of the drawing are common data or clocking signals. An extension of card data bus 47 is provided to each port. The remaining lines in the left-hand side of FIG. 6 are timing signals from FIG. 4.

All of the lines exiting on the right-hand side of FIG. 6 are lines associated only with the particular illustrated port, and each of them is duplicated for each of the other ports on the card and for all of the ports on other cards in the preferred embodiment.

The connection to a utilization device (not shown in FIG. 6) is tip/ring pair 168 for connecting the port to a conventional telephone set. Circuitry corresponding to utilization device interface 40 on FIG. 2 is surrounded by dashed line 40 on FIG. 6. This includes conventional protective circuitry 170 for interfacing a telephone set to this port. A ring control line 171 activates circuitry within circuits 170 for connecting ring voltage between the lines of tip and ring pair 178. Also, hook switch status line 129a is brought out from the interface circuitry.

Interface circuitry 170 is connected to a type MC3419 telephone line feed and two wire to four wire conversation circuit 175. This device is currently manufactured by Motorola Semiconductor Products. The conversion circuit 175 provides, on its four-wire side, a transmit output 177 and a receive input 178. Line 177 is provided as one input to a type 4053 multiplexer 179. Under normal operations, multiplexer 179 connects line 177 to line 180, the input to a type MC14403 CODEC 181. A receive output from CODEC 181 is connected to line 178. A control input to multiplexer 179 is carried on line 182. This input becomes active to connect line 180 to line 178 during loop-back-self-testing conducted under the control of master controller 20.

Control line 180 comes from one output of port command register 185. The other outputs from this register include ring control output 171, a power down control line 186, and a transmit data enable line 187. As can be seen from FIG. 6, port command register 185 accepts four bits from card data bus 47 when a port command write strobe signal for this particular port appears on line 167a. Thus, one output implements loop back testing, one output places CODEC 181 in a low power mode, another output applies ringing voltage between the tip and ring lines of tip/ring pair 186. Transmit data enable (TDE) line 187 enables the transmit port to be connected to the highways, as will be illustrated in connection with FIG. 7. Digital output from the CODEC (TDDa) appears on lines 188a. This is output to the bidirectional highway lines is shown on FIG. 7. CODEC 181 receives data over line 189a from the bidirectional highways.

The transmit data enable line 187 is provided to control access of outgoing data on line 188a to the bidirectional port during call set up and disconnect. Thus, it is possible to establish the transmit path by writing a time slot select control word into transmit time slot selector 49a before turning on the transmit data enable actually connecting this particular port to the bidirectional highway lines.

From the previous description, operation of time slot selectors 49a and 50a should be apparent. Suffice it to say that these selectors are embodied as type 74592 counters with integral registers. The terminal count output which appears on line 55a goes active as a conventional terminal count output. The transmit frame clock (TFC) on line 97 clocks the counter section of the 74592. Loading of the counter through parallel inputs from the register is controlled by the transmit load signal TLD appearing on line 16. Thus, the counter within time slot selector 49a cyclicly loads the number contained in the device's internal register into the counter, and counts at a rate determined by the TFC signal until a terminal count is reached causing line 55a to go high. Line 55a will thus stay high for a period equal to one time slot. The counter will be loaded by the next occurrence of the TLD signal and the operation will be repeated. Thus, for one time slot during each frame, line 55a will be active, activating the transmit data enable input of CODEC 181 causing the CODEC to transmit an eight-bit word over line 188a.

Data is written into the register of the 74592 in response to a transition on line 51a. Note that line 51a carries the transmit path select strobe (TPS) generated by the circuitry shown in FIG. 5. This strobe becomes active during the presence of a valid data word on card data bus 47 (which is logically identical to system data bus 22) such word being a path select command. The five lowest order bits of command data bus 47 carry the transmit time slot command. Thus, it will be appreciated that an eight-bit word on data bus 47 comprising a transmit path selection command contains five bits which are assigned to the transmit time-slot select command and three bits which are assigned to the transmit highway line select command. This conforms to the definition stated above that a path consists of a combination of highway line and time slot.

It will be readily appreciated that receive time slot selector 50a operates in exactly the same fashion as transmit time slot selector 49a. Upon the terminal count of the counter portion of the 74592, line 56a becomes active activating the receive data enable (RDE) input of CODEC 181. This allows the CODEC to accept an eight-bit serial data word over line 189a. The receive frame clock (RFC) and receive load (RLD) are referenced by numerals 97' and 116' to indicate that, in the preferred embodiment, the timing of these signals is identical to the corresponding timing signals on the transmit side carried on lines 97 and 116. However, it should be kept in mind that in embodiments of present invention in which the receive and transmit highway lines are not joined that these signals may not necessarily be identical.

Turning next to FIG. 7, the interface between highway data lines 15 and the receive and transmit paths of the eight ports of an illustrative card are shown. Again, all devices, lines and timing signal identical to those previously referenced in other figures are identified with the same reference numerals and signal names.

As previously illustrated in connection with FIG. 2, transmit data highways 15t and received at highways 15r are joined on a system backplane by jumpers 26. Thus, these lines form eight bi-directional highway lines in the preferred embodiment. Turning first to the transmit side, a register 43 comprising eight D flip-flops, connect eight output lines 190A through 190H to transmit highway lines 15t. Each of lines 190 is an output from one of the eight input AND gates 44. AND gates 44 have an output connected to a particular one of highway data lines 15 and one of each of its inputs is connected to a particular output from one of three line to one-of-eight data decoders 46. Decoders 46 are embodied type 74137 which contain integral onboard registers for select inputs, all of which are tied to sub bus 48 of card data bus CD.

Thus for example the Y0 output of decoder 46a is connected to line 191a, the Y1 output of decoder 46a is connected to line 192a . . . and the Y7 output of 46a is connected to line 199a. Similarly, line 191b carries the Y0 output of decoder 46b and line 199b carries the Y7 output. From inspection FIG. 7 it will be appreciated that all of lines 191 (all of the Y0 outputs of decoders 46) are connected to AND gate 44a. Similarly, all of lines 192 are connected to 44b . . . and all of lines 199 are connected to AND gate 44h. Thus, each one of the AND gates collects the appropriate lines from decoders 46 for connection to the particular one of highway data lines 15 associated with that gate.

When the preferred embodiment is operating properly, during any particular time slot one and only one of any one of the sets of lines 191 through 199 will be active. In other words, during any given time slot the greatest number of lines 191 from all of the Y0 outputs which will be active is one. Since the outputs of decoders 46 are active low, it will be appreciated that when all of the inputs to one of AND gates 44 are inactive, all inputs will be one and the and gate will be providing a logical one on its respective one of output lines 190.

The 74137 device, as noted above, include an integral register for latching a three-bit output select word from sub bus 148. The register strobe's (RSB) input is connected to line 151a which carries the transmit path select strobe signal. Thus, the three bits comprising the data highway line select command of the overall transmit path select command are latched into the internal register of decoder 46a when a transmit path select command is written to port zero on this particular card. From this point forward, it is only a question of the occurrance of the particular time slot upon which this port is to transmit, together with the appropriate enabling inputs, which will allow the signal from the transmit side of the associated port to be placed upon this selected data highway line.

Assume, for example, that the lowest numbered port illustrated in FIG. 6 is to be connected to the second data highway line connected to the Q2 output of register 43. Under these conditions, card data sub bus 48 will have carried the number 010 on card data lines CD5 through CD7 at the time the path select command was written into register 46A (and the register transmit time slot selector 49A on FIG. 6). Assuming that the connection has been set up, line 187a will be active because command register 185 (FIG. 6) will be outputting a logical one on line 187 enabling the port to be connected to its transmit data path.

When the particular time slot selected by selector 49a (FIG. 6) occurs, data will be provided on line 188a (FIGS. 6 and 7) to the negated enable (E1) input of register 46a. Thus, the register will be alternately disabled and enabled in response to logical ones and zeros present on line 188a. When a logical one is present, selector 46a becomes disabled placing a logical one output on line 192a forcing the output of AND gate 44b high. This output appears on line 190b and is clocked to the appropriate output of register 43 upon the next transition of the transmit data clock 88 connected to the clock input of register 43.

The outputs from register 43 are connected through open collector gates shown as 183 to highway data lines 15. It should be understood that the other inputs to gates 183 is a line which is activated during power-on reset to hold highway data lines in a particular state. It should also be understood that significant pull up capability (not shown) is provided on each of lines 15 on the system back plane. Thus, a plurality of ports may be interfaced to highway data lines 15 through the open collector gates in the manner described.

As noted above, register 43 provides a one bit time delay. It is important to use a device performing the function of this register in constructing embodiments of the present invention. Register 43 provides reclocking of data on the transmit side and thereby eliminates the effects of cumulative propagation delays and the like.

Physically, register 43 for each card in the preferred embodiment is located near the connector between card and the system backplane.

The receive side of this particular exemplary card is illustrated on the right hand side of FIG. 7. Naturally, since all manner of signals may be present, and ignored, until a particular line is connected to a receive port, the receive side circuitry is simpler than that of the transmit side. Highway data lines 15 are connected as inputs to a type 74540 inverting driver 10, the outputs of which appear collective lines 15'. Lines 15' form an eight bit bus which is distributed to the inputs eight-to-one multiplexers 45a through 45h. Each of these multiplexers, like registers 46, contains an internal register for a three bit select word. Three bit sub bus 48 is also provided to the select input of these devices. When a receive path command signal is written to a particular one of these registers, the three bit word, defining the particular highway data line on which the particular port is to receive, is latched into the appropriate one of registers 45.

Naturally, lines 52a through 52h each represent a receive path select strobe as generated by the circuitry of FIG. 5 for this particular card. Using register 45a as an example, the latched select word within the internal register of this multiplexer will connect a particular one of lines 15' to line 189a. Line 189a is provided to the data input of CODEC 181 on FIG. 6. Since this is a receive side, line 189 can continuously carry data which will be ignored by the CODEC until its receive data enable RDE input is activated by an active condition on line 56A (FIG. 6), indicating the occurrence of the appropriate receive time slot.

From the foregoing description of the preferred embodiment, persons skilled in the art will readily appreciate that the switch of the present invention may be used in systems for which time slots are concatenated or subdivided. In other words, the switch lends itself to implementing data communications paths with variable length time slots. As noted above, this can be accomplished without modifying the switch structure. Only the structure of the time slot selectors and the commands written to them must be altered.

For example, a second register may be added to the time slot selectors shown in FIG. 6. This register could load a counter clocked by the system bit clock TDC and a gate could be used to detect coincidence of count states of the two counters to subdivide time slots. Note that this only requires modification to the port structures and the memory map of the disclosed embodiment. All necessary timing signals are already provided on system clocking and timing bus 25 and the multiplexing devices which control access to the data highways respond only to data line select commands, not to the system clocking which defines time slots. Also, any time slot division/concatenation arrangement for which time slot select commands may be encoded into the number of bits available for time slot select commands may be implemented only by altering the circuitry of the time slot selectors at the ports.

The foregoing has been a detailed description of the preferred embodiment of the present invention as used in the environment of the PBX. In this description it will be appreciated that the present invention overcomes the drawbacks of the prior art and achieves the objects of the present invention stated above. From the disclosure of the preferred embodiment, other embodiments of the present invention will suggest themselves to those skilled in the art and thus the scope of this invention should be limited only by the claims below.

I claim:

1. An improved time division multiplexed switching structure comprising in combination:

N bidirectional highway lines, N being an integer greater than zero;

framing and clocking means for cyclicly defining M time slots on each of said N highway lines, M being an integer greater than one, and for providing clocking signals;

a plurality of input/output ports connected to said highway lines, to said framing and clocking means, and to a plurality of utilization devices, each of said input/output ports being capable of transmitting and receiving on a particular one of said highway lines defined by a path select command;

a master controller for providing said path select command to each of said plurality of input/output ports, said path select command defining said particular one of said N highway lines and a particular one of said M time slots; and a plurality of access controllers, at least one of said access controllers being connected to each said port and responsive to said path select command and said clocking signals to connect said utilization device to said particular one of said N highway lines defined by said path select command upon each occurrence of said particular one of said M time slots defined by said path select command.

2. A switching structure as recited in claim 1 wherein said path select command comprises a binary word having at least LOG$_2$[N X M] bits; LOG$_2$N of said bits comprising a highway line select command defining said particular one of said highway lines and LOG$_2$M of said bits comprising a time slot select command defining said particular time slot.

3. A switching structure as recited in claim 1 wherein: each said access controller includes memory means for storing said path select command.

4. A switching structure as defined in claim 2 wherein each said access controller includes a slot register for storing said time slot select command and a counter connected to said slot register, said counter including a terminal count output for providing a terminal count signal upon each occurrence of said counter counting to a predetermined terminal count;

said access controller being responsive to said clocking signals to cyclicly load said counter from said slot register to a preset count corresponding to said time slot select command, and to count in response to said clocking signals; and wherein said access controller operatively connects said one of said plurality of utilization devices to said particular one of said highway lines in response to said terminal count signal.

5. A switching structure as recited in claim 2 wherein each said access controller comprises:

a highway line register for storing said highway select commands;

multiplexing means connected to said highway line register, said utilization device, and said N highway lines for selectively connecting said particular one of said N highway lines corresponding to said highway select command upon each said occurrence of said particular one of said time slots defined by said time slot said select command.

6. A switching structure as recited in claim 1 wherein:

each of said plurality of input/output ports includes at least one register of a plurality of registers for storing said path select command;

said master controller includes a microcomputer characterized by a predetermined address space; and address decoding means defining a predetermined subset of said address space as a plurality of particular locations for said plurality of registers.

7. An improved time division multiplexed switching structure for a private branch exchange comprising in combination:

N bidirectional lines, N being an integer greater than zero;

framing and clocking means for cyclicly defining M time slots on each of said N highway lines, M being an integer greater than one and for providing clocking signals;

a plurality of input/output ports connected to said highway lines, to said framing and clocking means, and to a plurality of analog/digital conversion devices, each of said input/output ports being capable of transmitting and receiving on a particular one of said highway lines defined by a path select command;

means at each of said plurality of ports for connecting said analog/digital conversion device to a telephone interface, said telephone interface being in turn connected to a tip/ring pair;

a master controller for providing said path select command to each of said plurality of input/output ports, said path select command defining said particular one of said N highway lines and a particular one of said M time slots; and a plurality of access controllers, at least one of said access controllers being connected to each said port and responsive to said path select command and said clocking signals to connect said analog/digital conversion device to said particular one of said N highway lines defined by said path select command upon each occurrence of said particular one of said M time slots defined by said path select command.

8. An improved time division multiplexed switching structure comprising in combination:

N input/output highway lines, N being an integer greater than zero;

framing and clocking means for cyclicly defining M time slots on each of said N highway lines, M being an integer greater than one, and for providing clocking signals;

a plurality of input/output ports connected to said highway lines, to said framing and clocking means, and to a plurality of utilization devices;

a master controller for providing a path select command to each of said plurality of input/output ports, said path select command defining a particular one of said N highway lines and a particular one of said M time slots;

a plurality of access controllers, at least one of said access controllers being connected to each said port and responsive to said path select command and said clocking signals to connect said utilization device to said particular one of said N highway lines defined by said path select command upon each occurrence of said particular one of said M time slots defined by said path select command;

wherein said path select command comprises a binary word having at least $LOG_2[N \times M]$ bits; $LOG_2 N$ of said bits comprising a highway line select command defining said particular one of said highway lines and $LOG_2 M$ of said bits comprising a time slot select command defining said particular time slot;

wherein each said access controller includes a slot register for storing said time slot select command and a counter connected to said slot register, said counter including a terminal count output for providing a terminal count signal upon each occurrence of said counter counting to a predetermined terminal count;

said access controller being responsive to said clocking signals to cyclicly load said counter from said slot register to a preset count corresponding to said time slot select command, and to count in response to said clocking signals; and wherein said access controller operatively connects said one said plurality of utilization devices to said particular one of said highway lines in response to said terminal count signal.

9. An improved time division multiplexed switching structure comprising in combination:

N input/output highway lines, N being an integer greater than zero;

framing and clocking means for cyclicly defining M time slots on each of said N highway lines, M being an integer greater than one, and for providing clocking signals;

a plurality of input/output ports connected to said highway lines, to said framing and clocking means, and to a plurality of utilization devices;

a master controller for providing a path select command to each of said plurality of input/output ports, said path select command defining a particular one of said N highway lines and a particular one of said M time slots;

said path select command comprising a highway line select command defining said particular one of said N highway lines and a time slot select command defining said particular time slot;

a plurality of access controllers, at least one of said access controllers being connected to each said port;

each said access controller including a slot register for storing said time slot select command and a counter connected to said slot register, said counter including a terminal count output for providing a terminal count signal upon each occurrence of said counter counting to a predetermined terminal count, and each said access controller is responsive to said clocking signals to cyclicly load said counter from said slot register to a preset count corresponding to said time slot select command, to count in response to said clocking signals and to operatively connect said one of said plurality of utilization devices to said particular one of said highway lines in response to said terminal count signal.

* * * * *